Dec. 23, 1958  A. T. KUNKEL  2,865,061
WINDOW CONSTRUCTION
Filed Nov. 14, 1952  7 Sheets-Sheet 3
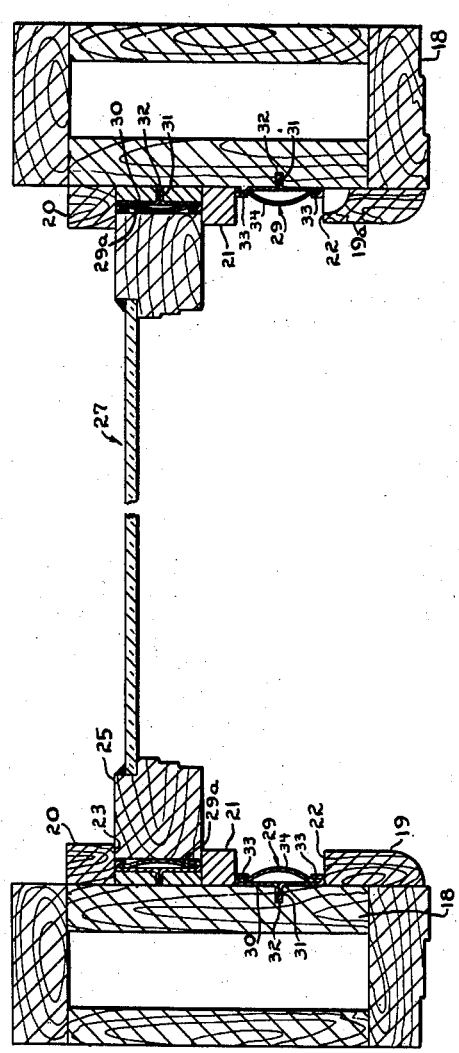
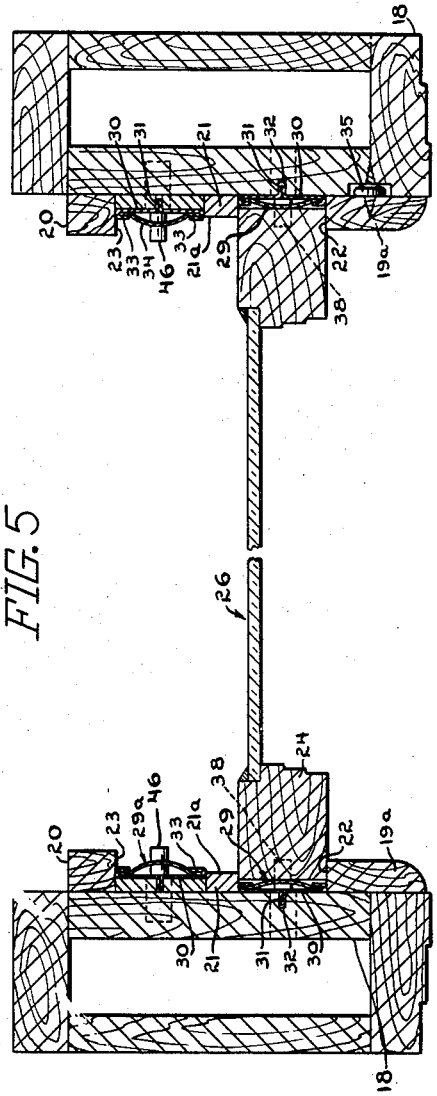
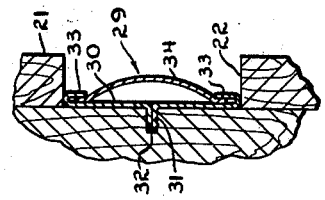
INVENTOR
Aloysius T. Kunkel
BY William Cleland
Attorney

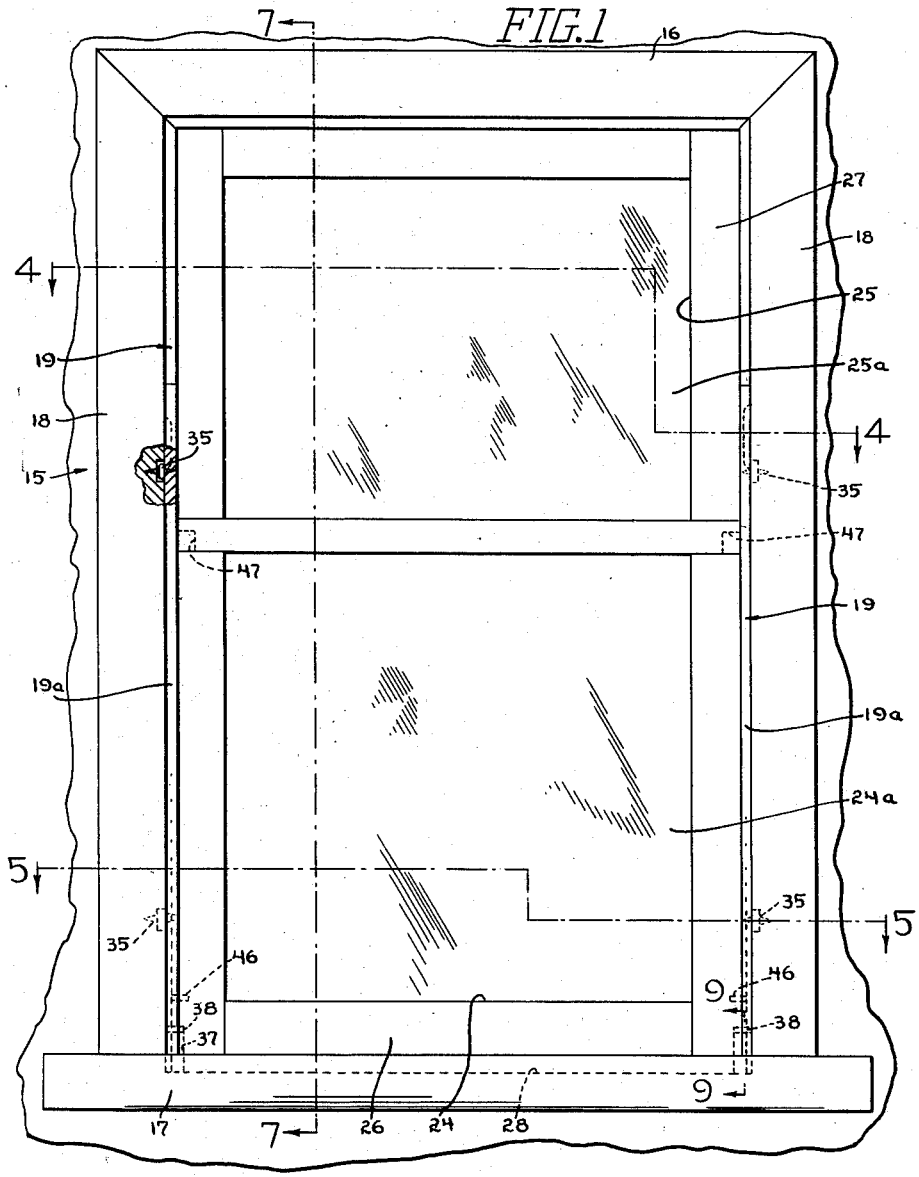

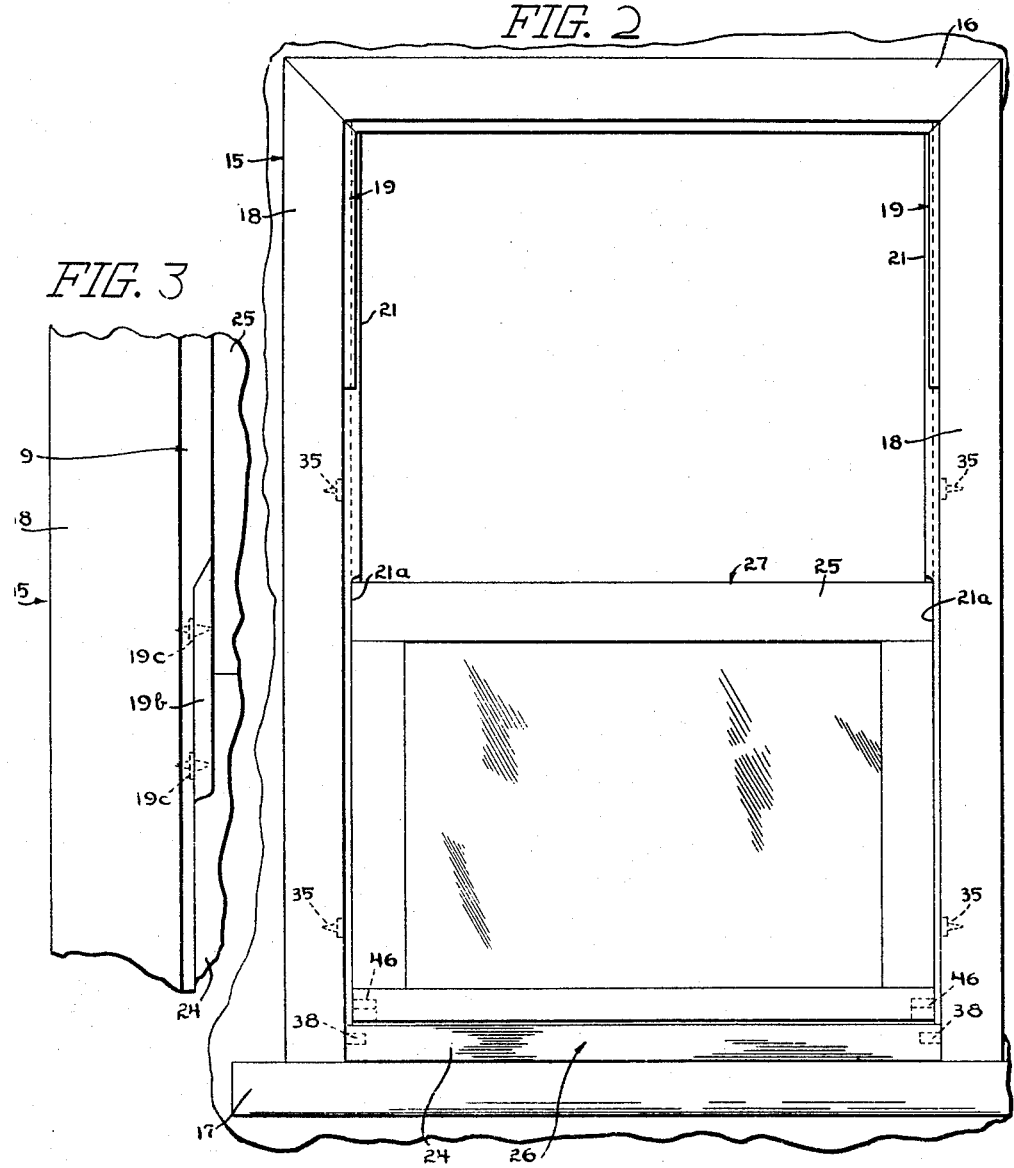

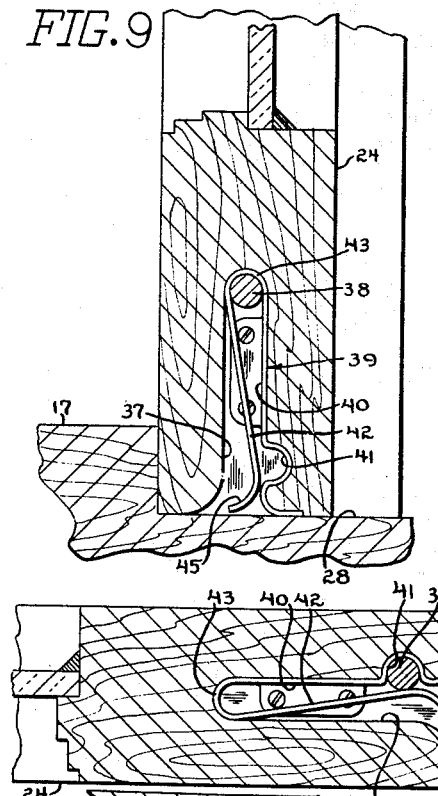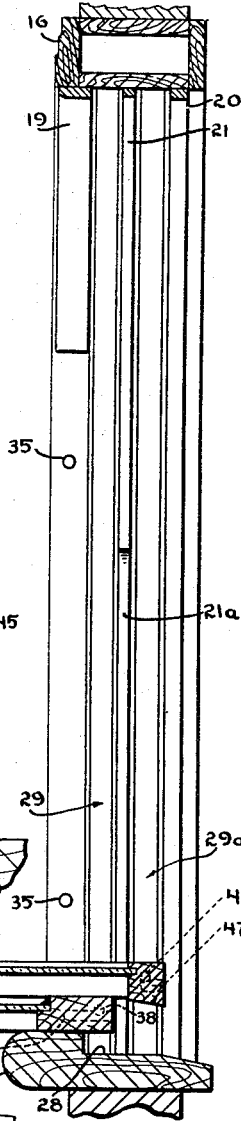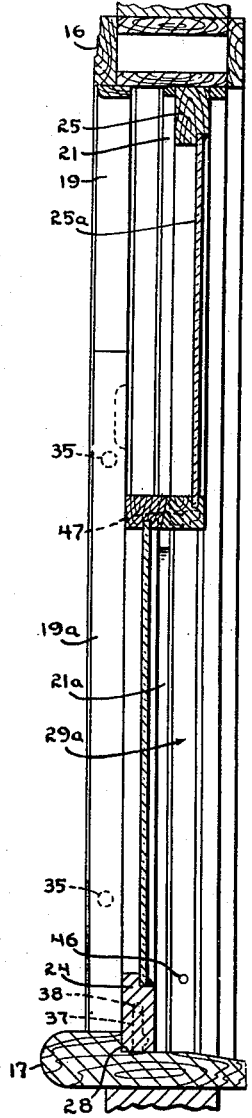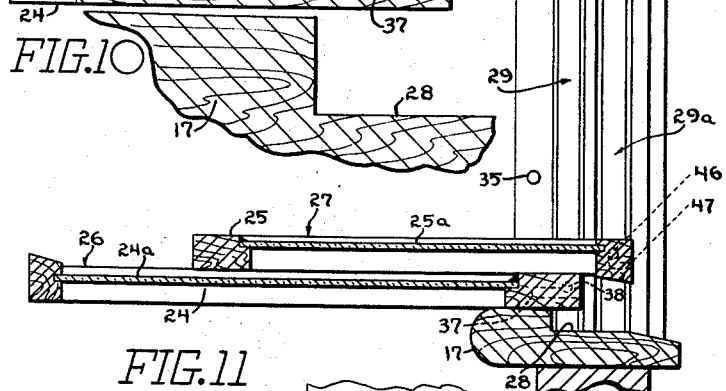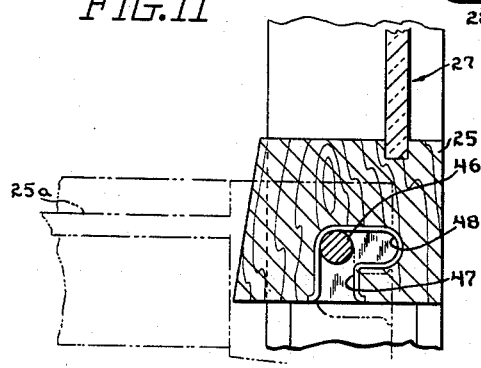

Dec. 23, 1958  A. T. KUNKEL  2,865,061
WINDOW CONSTRUCTION
Filed Nov. 14, 1952  7 Sheets—Sheet 5
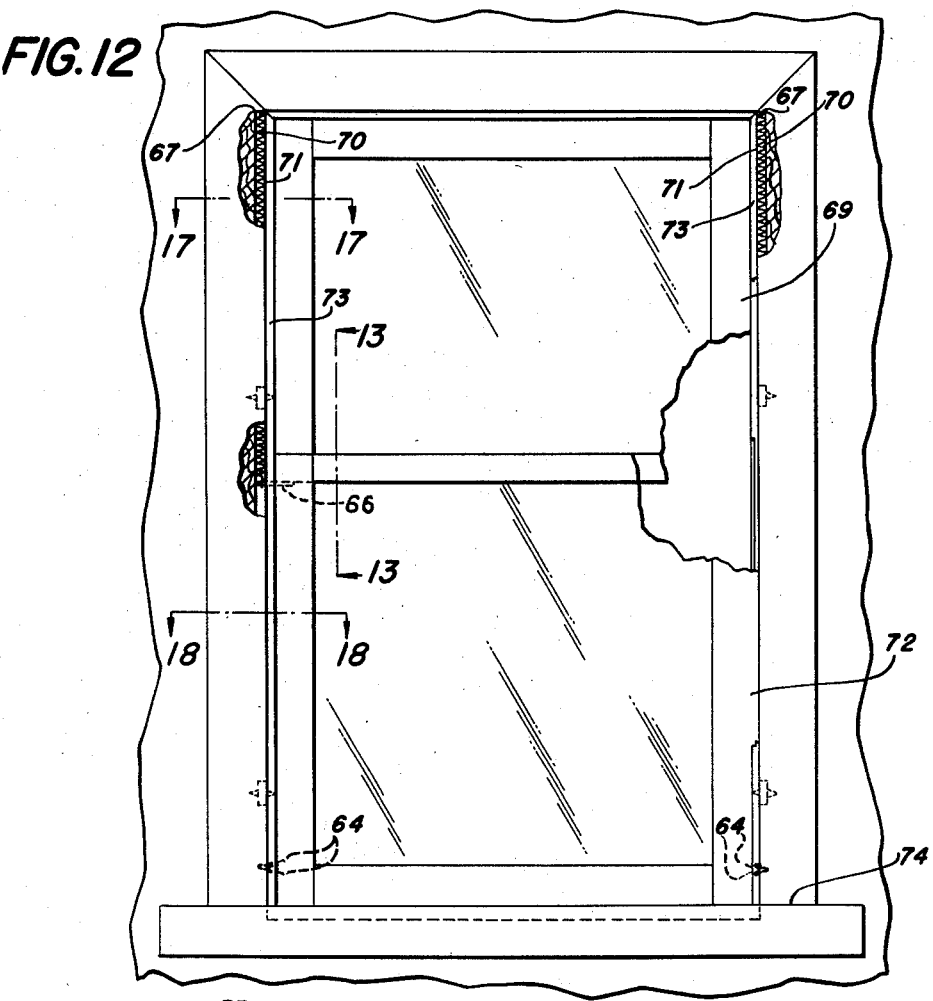
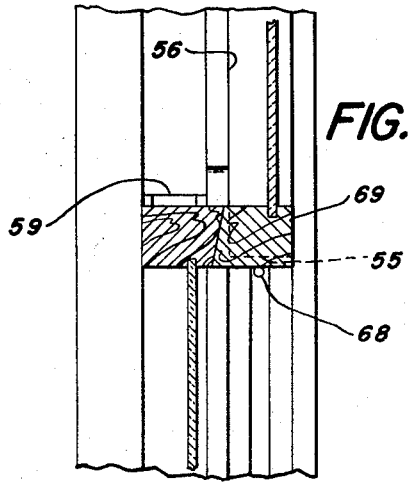
INVENTOR.
ALDYSIUS T. KUNKEL
BY
William Cleland
ATTORNEY Dec. 23, 1958     A. T. KUNKEL     2,865,061
WINDOW CONSTRUCTION
Filed Nov. 14, 1952     7 Sheets-Sheet 6
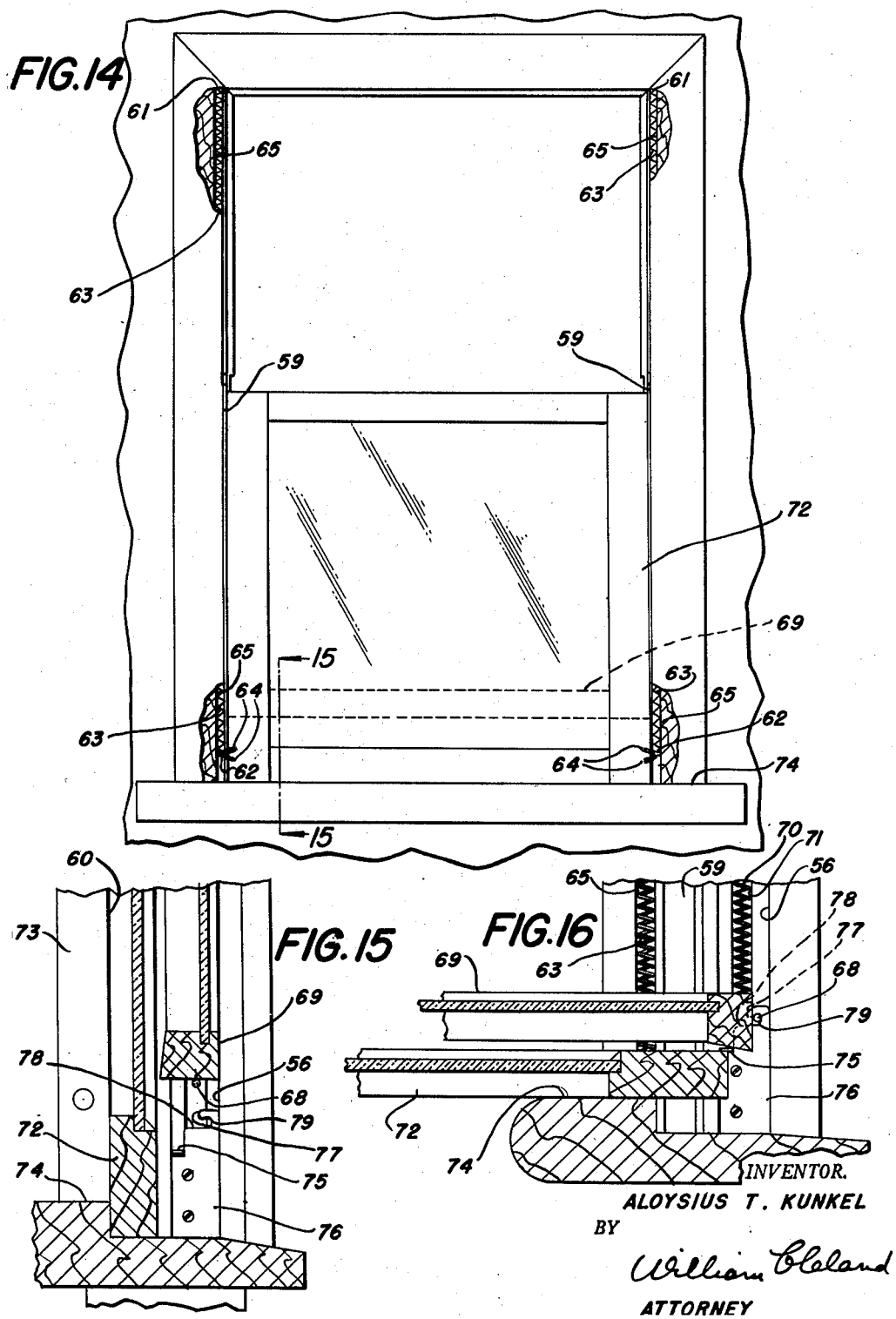
INVENTOR.
ALOYSIUS T. KUNKEL
BY
William Cleland
ATTORNEY Dec. 23, 1958 A. T. KUNKEL 2,865,061
WINDOW CONSTRUCTION
Filed Nov. 14, 1952 7 Sheets-Sheet 7

INVENTOR.
ALOYSIUS T. KUNKEL
BY
William Cleland
ATTORNEY

United States Patent Office 2,865,061
Patented Dec. 23, 1958

2,865,061

WINDOW CONSTRUCTION

Aloysius T. Kunkel, Akron, Ohio

Application November 14, 1952, Serial No. 320,422

3 Claims. (Cl. 20—42)

This invention relates to a window construction, and to weather sealing strip material for window or like closure structures.

This application is a continuation in part of application Serial No. 17,502, filed March 27, 1948, and which has now become abandoned.

One object of the invention is to provide a window construction which is economical to produce or adapt to old structures, the same including improved means by which the upper and lower sash are adapted to be pivoted inwardly to convenient positions for window washing or other purposes.

Another object of the invention is to provide in a window construction of the character described, improved weather-sealing by which is eliminated the usual necessity for use of sash weights or other counterbalancing devices.

Still another object of the invention is to provide in closure structures of the character described, improved weather-sealing strip material which is adapted to be readily installed without use of screws or nails.

Another object of the invention is to provide a window of the character described including improved counterbalancing for the upper and lower sashes which will not substantially interfere with easy inward pivotal movement thereof or with ready complete removal of the sashes from the window frame.

Other objects of the invention will be manifest from the following brief description and the accompanying drawings.

Of the accompanying drawings:

Figure 1 is a front elevational view, partly broken away and in section, of a window construction embodying the features of the invention, as viewed from the interior thereof, the window being in closed condition.

Figure 2 is an interior view similar to Figure 1, but illustrating a lower sash of the window pivoted inwardly to horizontal position and an upper sash thereof lowered for similar positioning.

Figure 3 is an enlarged fragmentary view of a portion of the jamb, at the vertical middle of the window, illustrating a modification of a parting strip structure thereof to accommodate a condition of which both upper and lower sashes are substantially the same size.

Figure 4 is a horizontal cross-section through the upper sash part of the window, taken substantially on the line 4—4 of Figure 1.

Figure 5 is a view similar to Figure 2, through the lower sash part of the window, taken substantially on the line 5—5 of Figure 1.

Figure 6 is an enlarged fragmentary view, corresponding to similar portions of Figures 2 and 3, and illustrating improved weather-sealing strip material embodying features of the invention.

Figure 7 is a vertical cross-section taken substantially on the line 7—7 of Figure 1.

Figure 8 is a view similar to Figure 7, but with both sashes pivoted to horizontally extending positions.

Figure 9 is an enlarged fragmentary cross-section, taken substantially on the line 9—9 of Figure 1, illustrating an improved pivotal arrangement at the bottom of the lower sash.

Figure 10 is a view similar to Figure 9, but illustrating the sash pivoted to the horizontal position thereof of Figure 8.

Figure 11 is an enlarged fragmentary view, similar to Figure 9, illustrating the pivotal connection of the upper sash.

Figure 12 is a view similar to Figure 1, illustrating a modified form of the invention.

Figure 13 is a cross-section taken substantially on the line 13—13 of Figure 12.

Figure 14 is a view similar to Figure 2, of the window shown in Figure 12.

Figure 15 is a cross-section taken substantially on the line 15—15 of Figure 14.

Figure 16 is a view corresponding to Figure 8, illustrating the sashes folded inwardly of the window.

Figure 17:
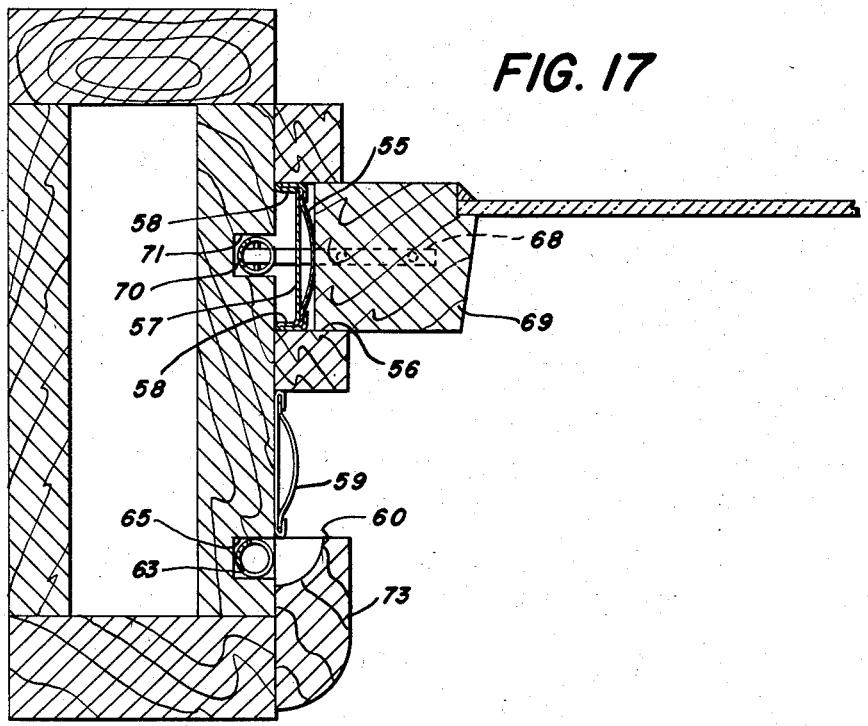
Figure 18:
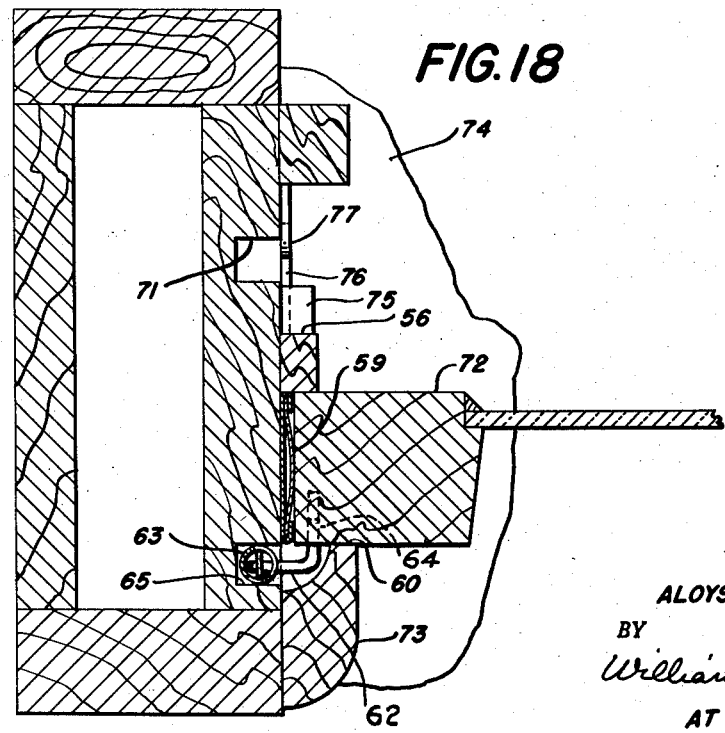

Figures 17 and 18 are enlarged fragmentary cross-sections, taken substantially on the lines 17—17 and 18—18, respectively, of Figure 12.

Referring to Figures 1 to 11 of the drawings, the numeral 15 designates a vertical window frame of the usual type including a header 16, a sill 17 and opposite side jambs 18, 18 (see Figures 1, 5 and 7). Each jamb has secured thereon inner and outer stop strips 19 and 20, respectively, and a parting strip 21 therebetween defining inner and outer guideways 22 and 23, extending the full length of the jambs for sliding reception of frames 24 and 25 of single lite lower and upper sashes 26 and 27, respectively. Similar stop and parting strips are provided on the header 16 in known manner. The sill 17 is off-set at 28 to provide the usual shouldered seat for reception of the bottom edge portion of lower sash 26.

Provided between each flat side edge of the lower sash frame 24 and the adjacent flat face of inner guideway 22, along the full length thereof, may be a length of weather-sealing strip 29 which is an improvement over that disclosed in prior patent No. 2,095,669, issued on October 12, 1937. The strip 29 may include a base strip 30 of metal or other suitable material, creased or folded upon itself to form a relatively rigid fin 31 intermediate the edges of the base and extending longitudinally thereof, this fin being tightly received in a groove 32 provided in the inwardly presented face of the respective guideway 22, whereby the sealing strip is adapted to be easily secured to the jamb without necessarily requiring the use of screws, nails or other fastening means. The edges of base strip 30 are oppositely inturned on the side opposite to said fin to provide guide channels 33, 33 for receiving opposite edges of a strip 34 of thin, flexible, resilient or springy material, such as spring brass or steel, the same being formed laterally arched outwardly of the base for yielding engagement thereof by the side edge of frame 24. Substantial clearance is provided between each edge of arched strip 34 and the adjacent inner portions of the channels 33, to allow for lateral flexing and flattening of the arched part as the sash is yieldingly engaged between the weather-sealing strips at opposite sides of the window frame. The arrangement is such that the lower sash may be moved vertically in the guideways against the resiliency of the flexible strips 34. The resiliency of these strips 34 is such that the edges of the frame 24 are effectively sealed against passage of air, and the sash will be yieldingly retained in any given raised or lowered position thereof along the guideways 22.

Provided in each outer guideway 23 may be a weather-sealing strip 29a, similar to the strips 29, adapted to seal and yieldingly slidably retain the upper sash 27 in the guideways, like parts of the strips 29a otherwise being given the same numerals as for strips 29. The frame 25 of sash 27 is narrower than that of the lower sash, so that it may be swung in a manner to be described, from a pivot point at the bottom of guideway 22, inwardly past cut-out portions 21a in each parting strip 21, provided along a substantial length thereof at the bottom corresponding to slightly more than the height of the upper sash. A substantial length 19a of the lower portions of each inner stop strip 19, corresponding to the height of the lower sash, is secured to the jambs as by means of snap fasteners 35, 35 to be easily temporarily removed to permit said inward swinging movement of the upper sash, as well as to permit similar inward swinging movement of the lower sash.

As best shown in Figures 1, 2 and 7 to 10, to provide for said inward swinging movement of the lower sash, slots 37 are provided in the side edges of the sash frame 24, opening from the bottom edge thereof, for receiving pins 38, 38 projecting freely from the guideways 22, adjacent the bottoms thereof when the sash is in lowered position. A generally U-shaped spring clip 39 is suitably secured in the slot 37 to line or reinforce the same and prevent wear on the frame. One arm 40 of the clip is fixed to the outer side of the slot and is provided with an off-set recess 41 for reception of pin 38 and the inner arm 42 extends freely from the bend of clip at 43 to adjacent the recessed portion 41. When the sash 24 is raised and lowered in guideways 22 the inner stop and parting strips 19 and 21 prevent entry of the pins 38 into the recesses 41. That is, the pins 38 are free to move into and out of the slots 37 past the spring arms 42, and to facilitate this action the outer end portions 45 of the arms 42 may be curved in the direction away from recesses 41. The arrangement is such, however, that, with the portions 19a of the strips 19 temporarily removed, and with the lower sash in lowered position (see Figures 7 and 9), the sash may be pulled inwardly at the top thereof, to pivot the same on the pins 38 received in the slots 37. By manipulating the sash, as for example during initial pivotal movement thereof, the spring arms 42 may be caused to urge the pins in the recesses 37 (see Figures 8 and 10). The spring tension yieldingly maintain this relationship, the recesses 37 being so located with respect to the bottom edge of the sash 24 that when the lower sash is swung to the position thereof shown in Figure 8 there will be no interference between said bottom edge and the upper sash, should it be in lowered position as shown in Figure 2.

The upper sash 27 is similarly adapted to be lowered in its guide channels 23 until a pin 46 near the bottoms thereof engage in slots 47 opening from the lower side edges of the sash frame 25, whereby the sash may be pivoted about the pins, to the horizontal position shown in Figure 8, where it may be supported on the lower sash, which in turn is supported on the sill 17. An off-set 48 is provided in each slot 47 to facilitate pivotal action, and the slots including the off-sets are metal lined to reinforce the sash frame against undue wear caused by the pins.

In normal use or operation of the improved window of Figures 1 to 11, the parts 19a of inner stop strip 19 are in place as shown in Figures 1, 5 and 7, and the upper and lower sashes 27 and 26 may be freely moved up or down for the full lengths of the guideways 23 and 22 thereof, respectively, against the yielding resiliency of the pairs of weather-sealing strips 29 and 29a. The lower sash will have guide support of the inner stops 19 and parting strips 21 also for the full lengths of channels 22 thereof. Although the parting strips are off-set at 21a sufficient length to permit inward swinging passage of the upper sash, as described above, the thicker upper portions extend below the top of the lower sash (see Figure 7) and thereby provide sufficient guiding surface for ordinary use of the upper sash in raising and lowering the same.

When it is desired to wash the window, for example, the lower sash 26 may first be pushed to the bottom of channel 22 until pins 38 are engaged in the slots 37 at the bottom edges of the sash, after which the inner stop portions 19a may be removed to permit swinging the sash inwardly to the position thereof shown in Figure 8. The sash 26, with the pins 38 yieldingly retained in recesses 41 by the spring arms 42, is easily pivoted to positions in which cleaning of the glass pane 24a may be cleaned on both sides. Similarly, the upper sash 27 may be lowered and pivoted on the pins 47 to convenient positions for cleaning the glass pane 25a (see full lines in Figure 8, and chain-dotted lines in Figure 11). The operation of moving the sashes 26 and 27 to the positions best shown in Figure 8, as well as the operation of returning the sashes to normal positions of Figure 7, may be performed in relatively few seconds of time, and there are no sash cords or other counterbalancing devices to interfere with either operation. It is a simple matter, also, to remove the sashes 26 and 27 from the window completely, if desired.

In instances where the upper and lower sashes are of substantially the same height, the off-set portions 21a of the parting strips 21 may be lengthened to permit free inward swinging movement of the upper sash, by providing a part 19b removably attached to each parting strip, as by means of snap fasteners 19c.

Referring now to Figures 12 to 18, there is shown a modified form of the invention in which the previously described construction may be utilized for relatively large or heavy windows, by provision of auxiliary means for counterbalancing the heavier sashes, or sashes having double glass, in the event that the resilient strip material in the guide channels is not wholly adequate to support such sashes against downward sliding movement by gravity. In this modified window the general construction and operation is substantially as before except for said counter-balancing means, and unless otherwise noted.

The sealing strips 55 for the opposite outer guide channels 56 may have channel-shaped base portions 57 yieldingly held in place solely by yielding resiliency of spaced flanges 58, 58 of the base portions, and these channels may be of relatively short length coextensive with the side edges of the upper sash in the upper position thereof. Correspondingly the sealing strips 59 for the inner guide channels 60 need only be of relatively short length coextensive with the side edges of the lower sash in closed condition of the same.

Extending between relatively fixed points 61 at the upper ends the side jambs within the inner guide channels 60, and pins 62 removably secured to the lower edges of the lower sash to extend laterally inwardly of the side jambs, may be tension springs 63 which need only be strong enough to provide said auxiliary counter-balancing support for the lower sash. Pins 62 may be secured to the lower sash by means of spaced prongs 64, 64 having angular extensions thereof removably received in correspondingly spaced holes in the inner face of the sash. One of the angular extensions 64 of at least one pin 62 may be shorter than the other to facilitate removal of that pin for detachment of its spring 63. The springs 63 are received in grooves 65 in the side jambs, in the manner best shown in Figures 17 and 18, so as not to interfere with attachment of the resilient strips 59 to the faces of the jambs, as by means of adhesive tape or strong cement.

Similarly extending between relatively fixed points 67 at the upper ends of the side jambs, within the outer guide channels 56, and pins 68 secured to the lower edge of upper sash 69 to extend laterally into said outer guide channel 56, may be tension springs 70 adapted to supplement the spring strips 55 in yieldingly supporting the upper sash in various positions of opening and closing sliding movement of the same. Tension springs 70 are shown received in grooves 71 in the jambs within the outer guide channels 56 as necessary to clear the side edges of the upper sash and to permit reception of the springs under the channel-shaped sealing strips 55.

For folding the lower sash 72 inwardly as shown in Figure 16, after removal of the removable inner stop strips 73, 73, as before, the same is pivotable on the high portion of the sill 74 to horizontal position in which an upwardly presented edge of the lower portion of the sash is in stop engagement with lugs 75 on plates 76 to be described later.

The upper sash 69 is similarly foldable to horizontal position, superposed on the lower sash, by first lowering it until the pins 68 at the lower edge of the same engage rounded cam portions 77 on the upper edges of the plates 76, which are suitably attached to the side jambs. Continued downward and inward swinging movement of the upper sash, against the action of its springs 70, naturally results in pins 68 being guided onto upwardly presented edges 78 constituting outward extensions of the lower sides of slots 79 within which the pins 68 then automatically engage for further pivotal movement of the upper sash (see Figure 16).

Conversely, the upper sash is released from the plates 76 by pivoting the sash upwardly thereon to vertical position, the pins 68 being released by urging the lower edge of the sash inwardly of the window to release the pins around the hook-like upper ends of the plates, and to permit upward movement of the sash toward closed position within its guide channels, and to be resiliently engaged between the sealing strips 55. The lower sash is similarly pivoted upwardly to vertical closed position between the resilient sealing strips 59, after which the removable inner stop strips 73 may be snapped into place as shown in Figure 12.

In the inwardly swung positions of the upper and lower sashes, as shown in Figure 16, the tension springs 70, 70 and 63, 63, respectively, are easily detached at the lower ends thereof to permit complete removal of the sashes from the window.

Other modifications of the invention may be resorted to without departing from the spirit thereof or the scope of the appended claims.

What is claimed is:

1. A window construction, comprising a frame having side jambs, inner and outer stop strips and a parting strip on each jamb defining vertical inner and outer guideways along the same, top and bottom sashes slidable in said inner and outer guideways, respectively, sealing strips resiliently mounted along said guideways for yieldingly engaging the edges of said sashes, pivot means adjacent the bottom of said guideways, bottom portions of said sashes being pivotally engageable with said pivot means in lowered positions of the sashes, at least a substantial proportion of said inner stop strips being detachable to permit pivoting of said inner sash about the pivot means thereof in said lowered position of the inner sash, said outer sash being narrower than said inner sash, the breadth between inwardly opposite faces of the lower end portions of said parting strips being sufficiently increased with respect to the upper portions thereof to permit inward passage therebetween of the relatively narrow outer sash but not outward passage of the relatively wider inner sash, whereby is permitted inward pivoting of said outer sash about the pivot means thereof in the lowered position of the outer sash, the sealing strips in said outer guideways extending from the upper ends thereof to at least adjacent the longitudinally central portions thereof, the sealing strips of said inner guideways extending from the lower ends thereof to at least adjacent the longitudinally central portions thereof, elongated weight-counterbalancing means extending coextensively with respect to the guideways and connected between the frame and lower portions of the respective sashes, said upper sash pivot means comprising plates secured to the jambs at the lower ends thereof, and pins extending laterally outwardly of the side edges of the upper sash adjacent the bottom thereof, said plates having notched portions opening inwardly for pivotal reception of said pins in vertically lowered position of the upper sash, and cam portions on said plates for guiding the pins into the notched portions when the upper sash is lowered to the pivotal position thereof.

2. A window construction, comprising a frame having side jambs, inner and outer stop strips and a parting strip on each jamb defining vertical inner and outer guideways along the same, top and bottom sashes slidable in said inner and outer guideways, respectively, sealing strips resiliently mounted along said guideways for yieldingly engaging the edges of said sashes, pivot means adjacent the bottom of said guideways, bottom portions of said sashes being pivotally engageable with said pivot means in lowered positions of the sashes, at least a substantial proportion of said inner stop strips being detachable to permit pivoting of said inner sash about the pivot means thereof in said lowered position of the inner sash, said outer sash being narrower than said inner sash, the breadth between inwardly opposite faces of the lower end portions of said parting strips being sufficiently increased with respect to the upper portions thereof to permit inward passage therebetween of the relatively narrow outer sash but not outward passage of the relatively wider inner sash, whereby is permitted inward pivoting of said outer sash about the pivot means thereof in the lowered position of the outer sash, the sealing strips in said outer guideways extending from the upper ends thereof to at least adjacent the longitudinally central portions thereof, the sealing strips of said inner guideways extending from the lower ends thereof to at least adjacent the longitudinally central portions thereof, elongated weight-counterbalancing means extending coextensively with respect to the guideways and connected between the frame and lower portions of the respective sashes, said upper sash pivot means comprising plates secured to the jambs at the lower ends thereof, and pins extending laterally outwardly of the side edges of the upper sash adjacent the bottom thereof, said plates having notched portions opening inwardly for pivotal reception of said pins in vertically lowered position of the upper sash, and cam portions on said plates for guiding the pins into the notched portions when the upper sash is lowered to the pivotal position thereof, said plates having shoulder portions thereon upwardly engageable by side edge portions of the inner sash in the inwardly pivoted condition thereof.

3. A window construction, comprising a frame having side jambs, inner and outer stop strips and a parting strip on each jamb defining vertical inner and outer guideways along the same, top and bottom sashes slidable in said inner and outer guideways, respectively, each sash having oppositely outwardly presented side edges, weather sealing members affixed to extend along each of said guideways, each said sealing members including a base of substantially the width of the respective said guideway thereof and being provided with oppositely inturned flanges defining laterally spaced channels and also including a strip of springy material having opposite edges thereof floatingly received in said channels, each said strip being laterally arched outwardly of said base thereof for yieldingly engaging on opposing said side edge of the respective said sash, pivot means adjacent the bottoms of said guideways, said arched strips having sufficient resiliency to provide for substantial yielding support for the respective sashes against gravitational movement thereof in the guideways, bottom portions of said sashes being pivotally engageable with said pivot means in lowered positions of the sashes, at least a substantial portion of said inner stop strips being detachable to permit pivoting of said inner sash about the pivot means thereof in said lowered position of the inner sash, said outer sash being narrower than said inner sash, the breadth between inwardly opposite faces of the lower end portions of said parting strips being sufficiently increased with respect to the upper portions thereof to permit inward passage therebetween of the relatively narrow outer sash but not outward passage of the relatively wider inner sash, whereby said outer sash pivots inwardly about the pivot means thereof in the lowered position of the outer sash, said weather sealing members in said outer guideways extending from the upper ends thereof to at least adjacent the longitudinally central portions thereof, said weather sealing members of said inner guideways extending from the lower ends thereof to at least adjacent the longitudinally central portions thereof, and sash-counterbalancing means including movable elongated elements depending from the upper portion of the frame coextensively with respect to at least one of the guideways of each said sash and lower ends of the elements being supportingly connected to the lower portions of the respective sashes, said frame having concealed recess portions receiving the respective said elements to move freely along the same unobstructedly with reference to said engagement of said arched strips with said side edges of the sashes.

References Cited in the file of this patent

UNITED STATES PATENTS

| | | |
|---|---|---|
| 642,279 | Albright | Jan. 30, 1900 |
| 1,123,196 | Kilmer | Dec. 29, 1914 |
| 1,254,775 | Carl | Jan. 29, 1918 |
| 1,332,361 | Schebora | Mar. 2, 1920 |
| 1,391,237 | Berry | Sept. 20, 1921 |
| 1,395,962 | Horner | Nov. 1, 1921 |
| 1,644,655 | Whistler | Oct. 4, 1927 |
| 1,663,870 | Whistler | Mar. 27, 1928 |
| 2,095,669 | Kunkel | Oct. 12, 1937 |
| 2,183,356 | O'Toole | Dec. 12, 1939 |
| 2,257,051 | Gossen | Sept. 23, 1941 |

FOREIGN PATENTS

| | | |
|---|---|---|
| 423,770 | Great Britain | Feb. 7, 1935 |